(12) United States Patent
Sanguinetti et al.

(10) Patent No.: US 10,331,412 B2
(45) Date of Patent: *Jun. 25, 2019

(54) METHOD AND DEVICE FOR OPTICS BASED QUANTUM RANDOM NUMBER GENERATION

(71) Applicant: Université de Genève, Genève (CH)

(72) Inventors: Bruno Sanguinetti, Genève (CH); Anthony Martin, Nice (FR); Nicolas Gisin, Vessy (CH); Hugo Zbinden, Genève (CH)

(73) Assignee: Université de Genève, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,454

(22) Filed: Jul. 25, 2017

(65) Prior Publication Data

US 2017/0337037 A1 Nov. 23, 2017

Related U.S. Application Data

(63) Continuation of application No. 14/697,320, filed on Apr. 27, 2015, now Pat. No. 9,747,077.

(30) Foreign Application Priority Data

Apr. 28, 2014 (EP) .................................... 14166272

(51) Int. Cl.
*G06F 7/58* (2006.01)
*H04L 9/08* (2006.01)
(Continued)

(52) U.S. Cl.
CPC .............. *G06F 7/588* (2013.01); *G06F 17/16* (2013.01); *H04L 9/0852* (2013.01); *G06F 2207/58* (2013.01); *G06N 10/00* (2019.01)

(58) Field of Classification Search
None
See application file for complete search history.

(56) References Cited

U.S. PATENT DOCUMENTS 4,833,633 A 5/1989 Morris
5,732,138 A 3/1998 Noll et al.
(Continued)

FOREIGN PATENT DOCUMENTS

EP 0 940 010 B1 5/2001
EP 1 821 196 A1 8/2007
(Continued)

OTHER PUBLICATIONS

Jennewein, Thomas, et al., "A fast and compact quantum random number generator," *Review of Scientific Instruments*, vol. 17, No. 4, pp. 1675-1680 (Apr. 2000).
(Continued)

*Primary Examiner* — David H Malzahn
(74) *Attorney, Agent, or Firm* — Christensen, Fonder, Dardi & Herbert PLLC

(57) ABSTRACT

A device for random number generation based on an optical process of quantum nature, including a light source emitting photons randomly, a light detector adapted to absorb the randomly emitted photons and to measure a number n of photons produced by the light source in a time interval T, and a randomness extractor. The detector includes a photon sensor acting as a photon-to-electron converter, an amplifier for converting the electron signal received from the photon sensor into a voltage and amplifying the voltage signal, as well as an analog-to-digital converter for processing the amplified signal received from the amplifier by encoding the amplified signal into digital values and sending these digital values to the randomness extractor for further processing such as to produce quantum random numbers (QRNs) based
(Continued)

on the number of photons produced by the light source in a time interval T.

15 Claims, 3 Drawing Sheets

(51) Int. Cl.
    *G06F 17/16*     (2006.01)
    *G06N 10/00*     (2019.01)

(56) References Cited

U.S. PATENT DOCUMENTS

| | | |
|---|---|---|
| 6,215,874 B1 | 4/2001 | Borza et al. |
| 6,249,009 B1 | 6/2001 | Kim et al. |
| 6,393,448 B1 | 5/2002 | Dultz et al. |
| 6,831,980 B1 | 12/2004 | Borza et al. |
| 7,284,024 B1 | 10/2007 | Trifonov et al. |
| 9,747,077 B2 * | 8/2017 | Sanguinetti ........... H04L 9/0852 |
| 9,772,820 B2 * | 9/2017 | Sanguinetti ........... H04L 9/0852 |
| 2003/0131031 A1 | 7/2003 | Klass |
| 2010/0030059 A1 | 2/2010 | Otte |
| 2012/0045053 A1 | 2/2012 | Qi et al. |
| 2013/0136255 A1 | 5/2013 | Brown |
| 2016/0328211 A1 | 11/2016 | Nordholt |
| 2017/0010865 A1 | 1/2017 | Sanguinetti |
| 2017/0030059 A1 | 1/2017 | Sanguinetti |
| 2017/0060534 A1 | 3/2017 | Sanguinetti |
| 2017/0337037 A1 * | 11/2017 | Sanguinetti ........... H04L 9/0852 |

FOREIGN PATENT DOCUMENTS

| | | |
|---|---|---|
| EP | 2 592 547 A1 | 5/2013 |
| GB | 2473078 A | 3/2011 |
| JP | 2009-70009 A | 4/2009 |
| WO | WO 01/95091 A1 | 12/2001 |
| WO | WO 02/091147 A1 | 11/2002 |
| WO | WO 2008/077833 A1 | 7/2008 |
| WO | WO 2013/003943 A1 | 1/2013 |

OTHER PUBLICATIONS

Wayne, Michael A., et al., "Low-bias high-speed quantum random number generator via shaped optical pulses," *Optics Express*, vol. 18, No. 9, pp. 9351-9357 (Apr. 26, 2010).

Bushing, marcan, segher, sven, "Ps3 epic fail," 27th *Chaos Communication Congress*, 134 pgs, (2010).

Lenstra, Arjen K., et al., "Ron was wrong, Whit is right," *Cryptology ePrint Archive*, 17 pgs., (2012).

Rarity, J.G., et al., "Quantum random-number generation and key sharing," *Journal of Modem Optics*, vol. 41, No. 12, pp. 2435-2444, (1994).

Saitoh, Yoshiaki, et al., "Generation of Physical Random Number Using Frequency-Modulated LC Oscillation Circuit with Shot Noise," *Electronics and Communications in Japan*, Part 3, vol. 88, No. 5, 8 pgs., (2005).

Stefanov, André, et al., "Optical quantum random number generator," *Journal of Modem Optics*, vol. 47, No. 4, pp. 595-598, (2000).

Vincent, CH, "The generation of truly random binary numbers," *Journal of Physics E: Scientific Instruments*, vol. 3, No. 8, 6 pgs., (1970).

Wei, Wei, et al., "Bias-free true random-number generator," *Optics Letters*, vol. 34, No. 12, pp. 1876-1878, (Jun. 15, 2009).

Chirgwin, Richard, "Android bug batters bitcoin wallets," *The Register*, 3 pgs., (2013).

Dorrendorf, Leo, et al, "Cryptanalysis of the Random Number Generator of the Windows Operating System," *ACM Trans. Inf. Syst. Secur.*, vol. 13, No. 1, pp. 1-32, (2009).

Bello, Luciano, "openssl—predictable random number generator," *Debian security advisory*, 1571-1, 7 pgs., (2008).

Gabriel, Christian, et al., "A generator for unique quantum random numbers based on vacuum states," *Nature Photonics*, vol. 4, No. 10, pp. 711-715, (2010).

Abadi, Martín, et al., "Control-Flow Integrity Principles, Implementations, and Applications," *ACM Transations on Information and Systems Security*, vol. 13, No. 1, Article 4, 40 pgs., (Oct. 2009).

Rivest, R.L., et al. "A Method for Obtaining Digital Signatures and Public-Key Cryptosystems," *Communications of the ACM*, vol. 21, No. 2, pp. 120-126, (Feb. 1978).

Shen, Yong, et al., "Practical quantum random number generator based on measuring the shot noise of vacuum states," *Physical Review A*, vol. 18, 063814, 5 pgs., (2010).

Troyer, M., et al., "A randomness extractor for the Quantis device," *ID Quantique Technical Paper on Randomness Extractor*, Version 1.0, 7 pgs., (Sep. 2012).

Kerckhoffs, Auguste, "La cryptographie militaire," *Journal des sciences militaires*, vol. IX, pp. 5-38, Jan. 1883, pp. 161-191, Feb. 1883.

* cited by examiner

METHOD AND DEVICE FOR OPTICS BASED QUANTUM RANDOM NUMBER GENERATION

RELATED APPLICATION

The present application is a continuation of U.S. patent application Ser. No. 14/697,320, filed Apr. 27, 2015, now U.S. Pat. No. 9,747,077, which claims priority to European Patent Application No. 14166272.6 filed Apr. 28, 2014, the disclosures of which are hereby incorporated by reference herein in their entireties.

FIELD OF THE INVENTION

The present invention pertains to a device for quantum random number generation based on an optical process of quantum nature comprising a light source emitting photons randomly as well as to a corresponding method, both allowing to obtain random numbers of high quality.

BACKGROUND OF THE INVENTION

In general, the present invention is situated in the context of the generation of random numbers. In fact, the generation of high quality random numbers is essential to security of many applications such as cryptographic protocols, both classical and quantum. For example, conventional asymmetric key protocols, like the well known DSA-, RSA- and Diffie-Hellman-algorithms, use random numbers, tested for primality, to generate their keys. Another example is the unconditionally secure one-time pad protocol which needs a string of perfectly random numbers of a length equal to that of the data to be encrypted. The main limitation of this protocol is the requirement for key exchange. Quantum key distribution offers a way to generate two secure keys at distant locations, but its implementation also requires a vast quantity of random numbers. All these examples reflect Kerckhoffs' principle which dates back to the $19^{th}$ century and states that the security of a cypher must reside entirely in the key.

It is therefore of particular importance that the key used in a cryptographic algorithm is secure, which in practice requires it to be chosen at random. In the past, weaknesses in random number generation have resulted in the breaking of a number of systems and protocols, such as reported by Arjen K. Lenstra, James P. Hughes, Maxime Augier, Joppe W. Bos, Thorsten Kleinjung, and Christophe Wachter in their article "Ron was Wrong, Whit is Right" published in 2012 in the *Cryptology ePrint Archive*. Such breakings concern many kind of fields like operating system security, see the article "Cryptanalysis of the Random Number Generator of the Windows Operating System" by Leo Dorrendorf, Zvi Gutterman, and Benny Pinkas published in *ACM Trans. Inf. Syst. Secur.*, 13(1):1-32, 2009, communication protocols, see the article "Openssl—Predictable Random Number Generator" by Luciano Bello published in *Debian security advisory* 1571-1, 2008, digital rights management, see the publication "Ps3 Epic Fail" by Bushing, Marcan, Segher, and Sven at the 27*th Chaos Communication Congress*, 2010, and Financial Systems, see the article "Android Bug Batters Bitcoin Wallets" by Richard Chirgwin published in *The Register*, 2013. Random number generation nowadays thus not only concerns defense issues such as initially targeted by Kerckhoffs' studies but has influence on many other fields like computer technology and science in general, economy, lotteries and games, as well as privacy issues of institutional—or individual's personal data stored or encrypted based on protocols using random numbers.

However, high quality random numbers are hard to produce, in particular they cannot be generated by a deterministic algorithm such as a computer program. In fact, existing algorithm-based quasi-random number generators may advantageously be used for simulation purposes, but are not adapted for cryptography, since the resulting quasi-random numbers are, in principle, reproducible. To ensure the uniqueness and, importantly, the randomness of the generated bit string, a physical random number generator is required, such as explained by C. H. Vincent in the article "The Generation of Truly Random Binary Numbers" in *Journal of Physics E: Scientific Instruments*, 3(8):594, 1970, or Y. Saitoh, J. Hori, and T. Kiryu in the article "Generation of Physical Random Number Using Frequency Modulated LC Oscillation Circuit with Shot Noise" in *Electron Comm. Jpn.* 3, 88(5):12-19, 2005.

In the past, two types of physical random number generators have been proposed which exploit the statistical nature of physical processes. Generators of the first type use processes which in principle obey deterministic laws but have chaotic nature due to complexity and incomplete knowledge of the initial system state. As an example, image sensors have been used to generate random numbers of classical origin by extracting information from a moving scene, e.g., a lava lamp, or using sensor readout noise, like disclosed by R. G. Mende, L. C. Noll, and S. Sisodiya in U.S. Pat. No. 5,732,138 entitled "Method for Seeding a Pseudo-Random Number Generator with a Cryptographic Hash of a Digitization of a Chaotic System", 1998. Other examples for such kind of physical random number generators are disclosed in U.S. Pat. Nos. 6,831,980, 6,215,874, WO2013/003943, EP 1 821 196, WO01/95091. However, the performance both in terms of randomness and throughput of such devices, respectively of corresponding methods, has been low.

Generators of the second type use physical processes which feature some intrinsic fundamental randomness, such as quantum mechanical processes. For this reason, quantum random number generators (QRNGs), which by their nature produce a string which cannot be predicted, even if an attacker has complete information on the device, are of particular interest, like explained in more detail in the article "Quantum Random-Number Generation and Key Sharing" by J. G. Rarity, P. C. M. Owens, and P. R. Tapster, published in *Journal of Modern Optic*, 41(12):2435-2444, 1994. Known QRNGs are based on specialized hardware, such as single photon sources and detectors like disclosed, for example, by A. Stefanov, N. Gisin, O. Guinnard, L. Guinnard, and H. Zbinden in their article "Optical Quantum Random Number Generator" published in *Journal of Modern Optic*, 47(4):595-598, 2000, photon pair sources in combination with beam splitters such as disclosed by Wolfgang Dultz and Eric Hildebrandt in their U.S. Pat. No. 6,393,448 entitled "Optical Random-Number Generator Based on Single-Photon Statistics at the Optical Beam Splitter", 2002, or the device proposed by W. Wei and H. Guo in the article "Bias-Free True Random-Number Generator" published in *Opt. Letters*, 34(12):1876-1878, 2009, or homodyne detection like disclosed for example by Christian Gabriel, Christoffer Wittmann, Denis Sych, Ruifang Dong, Wolfgang Mauerer, Ulrik L. Andersen, Christoph Marquardt, and Gerd Leuchs in their article "A Generator for Unique Quantum Random Numbers Based on Vacuum States" published in *Nat. Photon*, 4(10):711-715, 2010. Other examples for such kind of physical random number generators are disclosed in U.S. Pat. No. 7,284,024, US 2012/045053, JP 2009/070009, EP 2 592 547, GB 2 473 078, and WO02/091147. These QRNGs, however, have significant drawbacks, in particular in terms of size and complexity due to the required specialized hardware as well as in terms of speed and scalability, which entails high production cost, respectively limited applicability.

The solutions according to prior art therefore inherently comprise several problems. If known QRNGs indeed produce random numbers of quantum, i.e., random origin, the corresponding devices are complex and cost intensive. Devices which generate random numbers of classical origin have a low performance in terms of randomness and throughput.

SUMMARY OF THE INVENTION

It is an object of the present invention to overcome the above-mentioned difficulties and to realize a device for quantum random number generation as well as a corresponding method. The device should have reduced size, complexity, and production cost as well as increased scope of applicability as compared to existing devices.

To this effect, the present invention proposes a device which is characterized, in an embodiment, by the features enumerated in claim 1 and which allows to achieve the objectives identified above, as well as a corresponding method.

In an embodiment, the device for random number generation based on an optical process of quantum nature according to the present invention distinguishes by the fact that it further comprises a light detector adapted to absorb the randomly emitted photons and to measure a number n of photons produced by said light source in a time interval T, and a randomness extractor, wherein the detector comprises a photon sensor acting as a photon-to-electron converter, an amplifier for converting the electron signal received from the photon sensor into a voltage and amplifying the voltage signal V, as well as an analog-to-digital converter for treating the amplified signal V received from the amplifier by encoding the amplified signal V into digital values d and sending these digital values d to the randomness extractor for further processing such as to produce quantum random numbers (QRNs) based on said number n of photons produced by the light source in a time interval T.

According to embodiments of this device, the light source may be chosen as a light emitting diode or a laser diode and the photon sensor may be formed by a CCD camera or a CMOS camera. The camera, respectively in general the photon sensor, is operated in the linear regime where its Fano factor is close to 1, and—for optimal performance—the analog-to-digital converter is tuned such as to have an electron-to-digital conversion factor $\zeta$ fulfilling the condition $\zeta \geq 1$.

These and other operating parameters of the camera, of the processing electronics, and of the randomness extractor which are specified in more detail in the following description allow to realize a small size and low cost quantum random number generator which produces high quality random numbers of quantum origin and which may be integrated in number of stationary or mobile apparatuses and instruments.

The invention is also related to a corresponding method and computer program means adapted to implement this method.

Other features and advantages of the present invention are mentioned in the dependent claims as well as in the description disclosing in the following, with reference to the figures, the invention in more detail.

BRIEF DESCRIPTION OF THE FIGURES

The attached figures exemplarily and schematically illustrate the principles as well as several embodiments of the present invention.

DETAILED DESCRIPTION OF THE INVENTION

In the following, the invention shall be described in detail with reference to the above mentioned figures.

In a first part, the concept of the proposed system, including its various entropy sources and how the entropy of quantum origin can be extracted, shall be described. In a second part, two different embodiments of the proposed random number generation shall be exposed. Finally, the results obtained with the help of these random number generators in terms of generated random numbers shall be presented, including tests performed on the generated random numbers.

Figure 1:
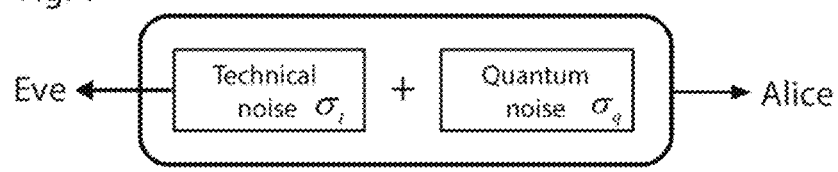
FIG. 1 schematically illustrates the distribution of probability P(n) that a number n of photons is measured by an image sensor's pixel, said probability being the combination of quantum uncertainty $\sigma_q$ originating from the quantum nature of a light source and technical noise $\sigma_t$ originating from the technical equipment used.
Figure 1:
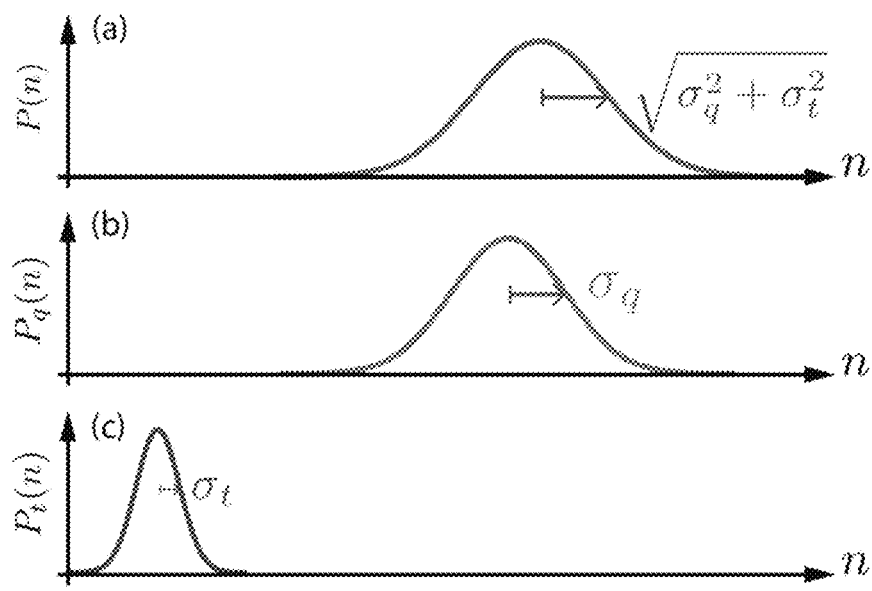

The concept of the present invention relies on the fact that some properties of a quantum state are unknown before measurement as well as fundamentally unpredictable. One such property, used in most known QRNGs, is the path taken by a photon impinging on a beamsplitter. Another such property is the number of photons produced by a light source in a time interval T. It is the latter effect which is used in the context of this invention. In fact, most light sources emit photons at random times or emit a random number of photons at a time. For ease of the language, both of these effects shall in the further course of the description be embraced by the wording that such light sources emit photons randomly. In any case, it is impossible to predict the number of photons emitted per unit time. This quantum effect is usually called "quantum noise" or "shot noise" and has been shown to be a property of the light field rather than a technical limitation of the light source or of the detector, see e.g., the article "Experimental Realization of Sub-Shot Noise Quantum Imaging" by G. Brida, M. Genovese, and I. R. Berchera published in *Nat. Photon,* 4(4):227-230, 2010. Only some particular light sources, namely amplitude-squeezed light, can overcome this fundamental noise, such as reported by Daniel F. Walls in the article "Squeezed States of Light" published in *Nature,* 306:141-146, 1983. Beside these very specific sources, the number of photons emitted by a light source per unit of time T is governed by a Poisson distribution with standard deviation $\sigma=\sqrt{\bar{n}}$, where $\bar{n}$ is the mean number of photons emitted in time interval T. Therefore, this quantum effect may be exploited to realise a QRNG by using a detector capable of resolving this distribution, such as to generate random numbers originating from a fundamentallly random physical process. Such as schematically illustrated in FIG. 1, the basic assumptions of this approach consist in that (a) a number n of photoelectrons can be measured by a detector, e.g., an image sensor's pixel, with a probability P(n), (b) this measured distribution will be, assuming that the detector is operating in a linear regime, the combination of quantum uncertainty $\sigma_q$ and technical noise $\sigma_t$, and (c) from a single shot measurement these two noise components cannot be distinguished, however the technical noise $\sigma_t$ is assumed to be fully deterministic and thus known to an adversary. As will become clear in the following, it is preferable, but not necessary, for realization of a QRNG according to the present invention that the inevitable technical noise $\sigma_t$ of the detector is smaller, or comparable to, the quantum uncertainty $\sigma_q$ originating from the quantum nature of the light source.

Figure 2:
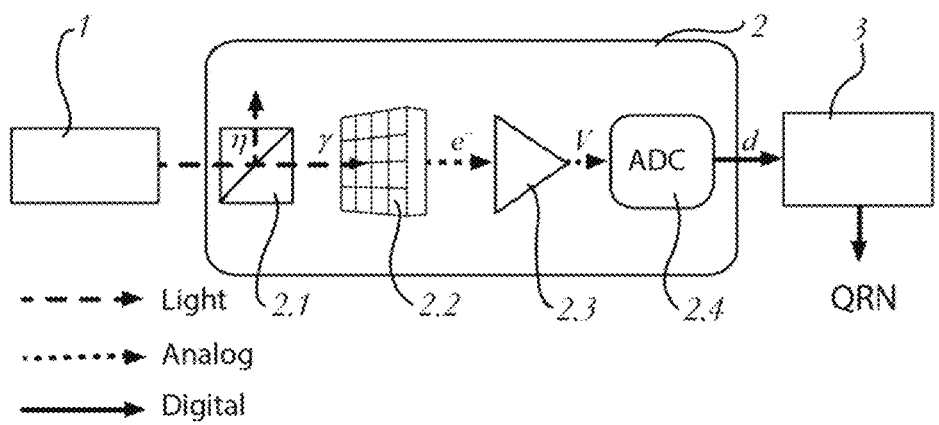
FIG. 2 schematically illustrates the principal components of a device for random number generation according to an embodiment of the present invention, these components being a light source, a detector, and a randomness extractor, wherein the detector comprises several sub-elements, as well as the operating principle of the device.

A device adapted to realize the above concept comprises, such as shown schematically in FIG. 2, a light source 1, a detector 2, and a randomness extractor 3. The light source 1 may be chosen amongst a light emitting diode (LED), a laser diode (LD), or any other adequate light source, even ambient light, as long as the source emits photons randomly in the meaning defined above. The detector 2 comprises several elements and can be modelled, such as also schematically indicated in FIG. 2, as lossy channel 2.1 with a transmission probability η, similar to a beamsplitter with a given splitting ratio, followed by a photon sensor 2.2 acting as a photon-to-electron converter with unit efficiency. In this model, the transmission probability η contains all the losses due to the optical elements and the photon sensor's 2.2 quantum efficiency. The photon sensor 2.2 may be realized by any kind of photon detector, in particular by an image sensor with an array of pixels or even by each individual pixel of such an image sensor, like a nowadays commercially available CCD or CMOS camera or similar off-the-shelf components adapted to act as an image sensor and having sufficient light sensitivity. A small quantity of light from the light source 1 impinges on the photon sensor 2.2. This can be done by guiding, reflecting or scattering at the dye, package or assembly level. For each absorbed photon γ, the photon sensor 2.2 generates an electron e⁻, such as symbolically indicated in FIG. 2. The detector 2 further comprises processing electronics, in particular an amplifier 2.3 for converting the electron signal received from the photon sensor 2.2 into a voltage and amplifying the voltage signal V as well as an analog-to-digital converter (ADC) 2.4 which treats the amplified signal V received from the amplifier 2.3 by encoding the amplified signal V representing photon, respectively electron numbers into digital values and sending these values to further processing, i.e., to said randomness extractor 3 which will be described in more detail hereafter. The amplifier 2.3 and the ADC 2.4 may also be chosen amongst commercially available elements. All the above mentioned components may be integrated at a circuit, package or dye level. Advantageously, the randomness extractor can be implemented in software, but is also possible to realize that component by hardware. Furthermore, in the context of the processing electronics, it is possible to define an electron-to-digital conversion factor ζ. If ζ≥1, then for each possible number of electrons generated by the photon sensor 2.2, i.e., for each possible number of photons produced by the light source 1 and absorbed by the sensor 2.2, there is one unique digital value or code at the output of the ADC 2.4, i.e., at the output of the detector 2. The condition ζ≥1 is thus not an obligatory requirement, but preferred for optimal performance of the device. To complete the model of the detector, noise needs to be added, since noise of different origins like, e.g., thermal noise, leakage current, or readout noise cannot be avoided in a real device. In general, this noise follows a normal distribution and adds linearly to the signal, like symbolically indicated in FIG. 1.

Consequently, a device such as described above allows to access the shot noise statistics of the light source 1 and thus to generate random numbers of quantum origin. In fact, each photon absorbed by the photon sensor 2.2 will generate an electron, in particular within a corresponding pixel if an image sensor with an array of pixels is used. The number of electrons generated in time interval T is unpredictable, due to the quantum nature of light and of the absorption process. The number of electrons is converted to a voltage, amplified and digitized by components internal or external to the sensor 2.2. It is important that the amount of light and the parameters for the amplification and digitization are appropriate, so that a significant amount of quantum entropy is collected. Not all the entropy generated by this process has a quantum origin, because some is due to classical noise, such as electrical, thermal, amplification, digitization noise or structure given by the image itself. However, an appropriately tuned randomness extractor 3 allows to ensure that the output random numbers have a quantum origin, i.e., that the amount of quantum entropy per output bit is close to 1, such as will become clear in the further course of the description which will also specify in more detail the required amount of light and said parameters for the amplification and digitization.

In fact, at the output of the detector 2, a random variable $X=X_q+X_t$, where $X_q$ and $X_t$ are independent random variables taken from the quantum uncertainty distribution $D_q$ and the technical noise distribution $D_t$, respectively, is obtained. The technical noise is assumed to be completely known to an adversary, called "Eve" in FIG. 1, such that it is only possible to rely upon the quantum entropy generated. Thus, the amount of quantum entropy at the output of the detector 2 will correspond to the entropy of a Poisson distribution with a mean equal to the average number of photons absorbed $\bar{n}$, which—expressed in bits—is $$H(X_q)=\bar{n}/\ln(2)[1-\ln(\bar{n})]+e^{-\bar{n}}/\ln(2)\Sigma\bar{n}^m \ln(m!)/m! \qquad (1).$$

For large values of $\bar{n}$ this expression can be approximated to $$H(X_q)=\ln(2\pi e \bar{n})/(2\ln(2)) \qquad (2)$$

To collect this entropy entirely, the detector preferably should fulfil the condition ζ≥1 mentioned above. The measured value X can be encoded over b bits, but it is of course possible to encode the value on another basis than the binary system. The entropy $H(X_q)$ of quantum origin per bit of the output will be on average $H(X_q)/b<1$. Assuming adequately chosen operating conditions such as mentioned here above, where the ADC 2.4 is not saturated, the entropy s per bit can be approximated by dividing $H(X_q)$ by the number of output bits of the ADC. To obtain a string of perfectly random bits, i.e., with unit quantum entropy per bit, an extractor is required. As detailed in the article "A Randomness Extractor for the Quantis Device" by M. Troyer and R. Renner, published in *Id Quantique Technical Report*, 2012, and the content of which is incorporated herein by reference, an extractor computes a number k of high-entropy output bits $y_j$ from a number l>k of lower-entropy input bits $r_i$. This can be done by performing a vector-matrix multiplication between the vector formed by the raw bit values $r_i$ and a random l×k matrix M (performed modulo 2) according to $$y_j = \Sigma M_{ji} r_i \quad (3).$$

Although the elements of M are randomly distributed, the matrix M serving as randomness extractor 3 usually is a pre-generated constant. For raw input bits with entropy s per bit, the probability that the output vector $y_j$ deviates from a perfectly random bit string is bounded by $$\epsilon = 2^{-(sl-k)/2} \quad (4).$$

Alternatively, an adequate randomness extractor 3 may also be realized by a hash function performing an operation equivalent to the above described matrix-multiplication extractor. This is known to the person skilled in the art and thus doesn't need to be further described at this place.

In order to demonstrate the feasibility of a device such as described above, comprising a light source 1, a detector 2, and a randomness extractor 3 of the type just described, as well as the results which may be obtained with a such device, two different embodiments of the proposed random number generator shall now be exposed. In fact, in recent years, image sensors like the ones found in digital cameras and smartphones have improved enormously. Their readout noise nowadays is of the order of a few electrons and their quantum efficiencies can achieve 80%. Besides their ability to resolve quantum noise with high accuracy, such image sensors are intrinsically parallel and offer high data rates. It is thus possible to use such image sensors as a component of a quantum random number generator according to the present invention, which shall in the following be demonstrated both with a commercial astronomy monochrome CCD camera, an ATIK 383L camera, and a CMOS sensor in a mobile phone, a Nokia N9 camera. The latter is a color camera from which only the green pixels were used for the purpose of the following demonstration.

Figure 3:
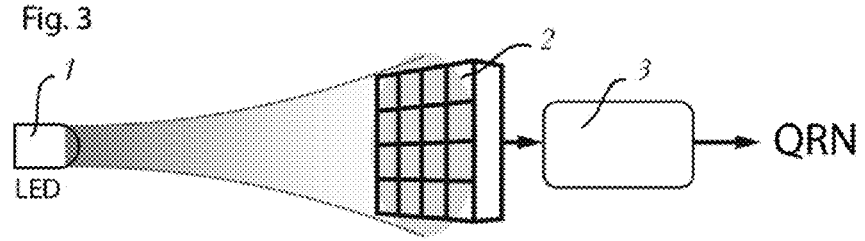
FIG. 3 shows in schematical manner an example of a device for random number generation according to an embodiment of the present invention, the device comprising an LED as a light source, a detector illuminated by said LED, and a randomness extractor which treats the digital output of the detector.

FIG. 3 shows in schematical manner an example of a device for random number generation according to an embodiment of the present invention, the device comprising a light source 1 which is realized by a LED, a camera 2 which is fully and homogeneously illuminated by said LED and the raw data of which, i.e., the binary representation of pixel values produced by the camera 2, are concatenated and passed through a randomness extractor 3 which in turn outputs quantum random numbers (QRNs) ready to be used. The camera 2 is supposed to be formed either by said ATIK 383L camera or said Nokia N9 camera.

At first place, it shall be checked that the above mentioned cameras comply with the manufacturer's specification and that the operating conditions are appropriate for the generation of quantum random numbers. With respect to the latter point, it is important that the photon number distribution does not exceed the region where the camera, respectively the photon detector realized therewith, is linear and that there are enough digital codes to represent each possible number of absorbed photons, i.e., that the condition $\zeta \geq 1$ already mentioned above is fulfilled.

To characterize the two cameras mentioned above, a well-controlled light source like a LED, such as schematically shown in FIG. 3, is used. According to the principles shown in FIG. 2, a number of photons n is absorbed by the photon sensor 2.2 of each camera 2 and converted into an equal number of electrons. This charge is in turn converted into a voltage by the amplifier 2.3 and finally digitized by the ADC 2.4. For ease of description, these components are supposed to form part of the camera 2 in FIG. 3. The amplifier gain, which in commercially available cameras corresponds to the "ISO" setting, is chosen such that each additional input electron will result in an output voltage increase sufficient to be resolved by the ADC, which means that each electron increases the digital output code c by at least 1. This can be checked by illuminating the cameras with a known amount of light. By doing so and using the nominal quantum efficiency of the cameras to infer $\bar{n}$, one observes $\zeta = c/e$ to be 2.3 codes/electron for the ATIK camera, and 1.9 codes/electron for the Nokia camera, as expected from the devices' specifications.

Figure 4A:
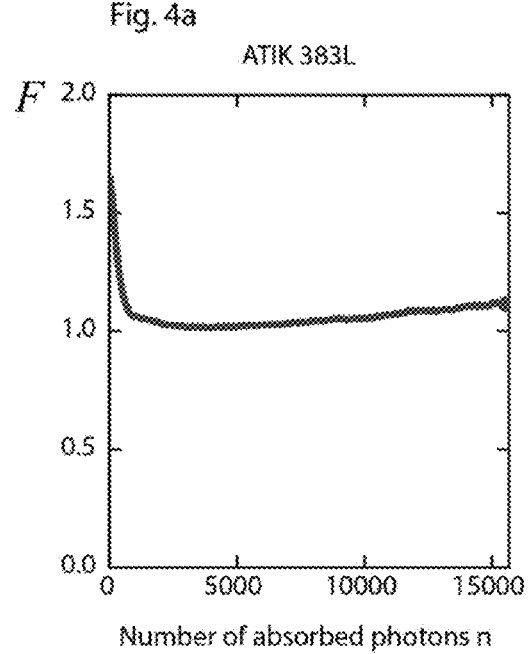
FIGS. 4a and 4b show, for an ATIK 383L camera, respectively for the camera included in the Nokia N9 mobile telephone, the Fano factor F for various illuminating intensities.
Figure 4B:
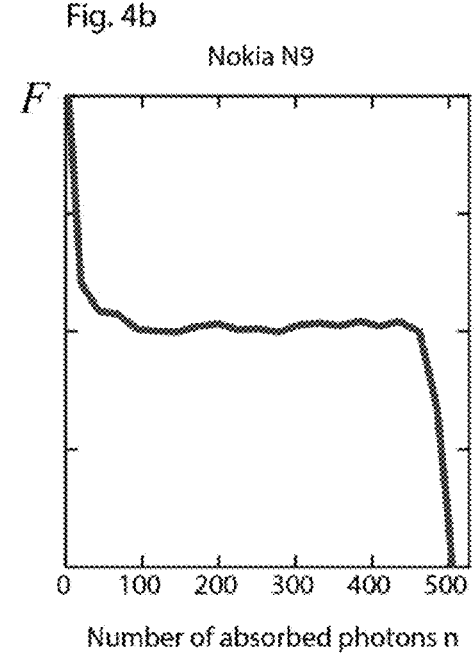

The value of $\zeta$ can then be used to infer the number n of absorbed photons from the digital reading. This allows to evaluate the Fano factor F, defined as $F = \sigma^2(n)/\bar{n}$, which is expected to be 1 for a Poisson distribution. Conversely, the fact that for a linear detector the Fano factor F=1 can be used to measure $Q_e$ and $\zeta$. FIGS. 4a and 4b show, for the ATIK camera, respectively for the Nokia camera, the Fano factor F obtained in this way for various illuminating intensities of these detectors. Accordingly, both detectors have a large range of intensities where the Fano factor is close to 1, in particular both the ATIK and the Nokia cameras have good linearity, i.e., better than 0.998 for a large range of light intensities. In this range, the statistics are dominated by the quantum uncertainty, i.e., by the shot noise. At strong illuminations, saturation occurs, which means that the Fano factor decreases, as the output is a constant. For the Nokia N9 camera, this happens at intensities corresponding to about 450 to 500 absorbed photons per pixel, whilst for the ATIK camera this happens at about $2 \times 10^4$ absorbed photons per pixel. This is due to the high amplifier gain used, which was chosen at ISO 3200. At low illumination intensities, a Fano factor much greater than 1 is observed, which is due to the detector's technical noise.

Image sensors such as CCD and CMOS have various sources of noise, like thermal noise, leakage current and readout noise. Thermal and leakage noise accumulate with integration time, such that it is possible to eliminate or at least greatly reduce these noise sources by using short exposure times, e.g., exposure times of the order of a millisecond, e.g., in the range of 0.1 to 100 milliseconds. In this case, readout noise becomes the dominant source of technical noise and is given by the readout circuit, the amplifier and the ADC. In image sensors, noise is usually counted in electrons (e⁻). The ATIK 383L CCD camera and the Nokia N9 CMOS camera have a noise of 10 e⁻, and 3.3 e⁻, respectively. However, it is not possible to generalize the values of the exposure times indicated above for all types of cameras, since this also depends on the impinging light intensity. In fact, the exposure time has to be chosen depending on the type of camera, i.e., the type of detector 2, and the light intensity such that the detector works in its linear regime and that, preferably, the readout noise becomes the dominant source of technical noise. In practice, the exposure times thus may vary greatly.

Figure 5A:
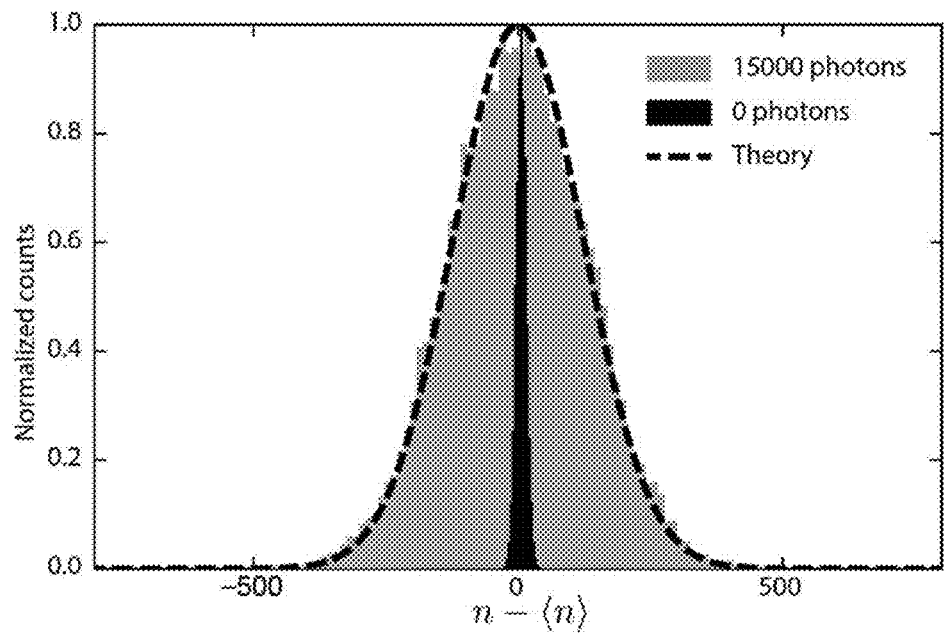
FIGS. 5a and 5b show normalized histograms of the photon distributions obtained when using an ATIK 383L CCD camera and a Nokia N9 CMOS camera, respectively, as a detector.
Figure 5B:
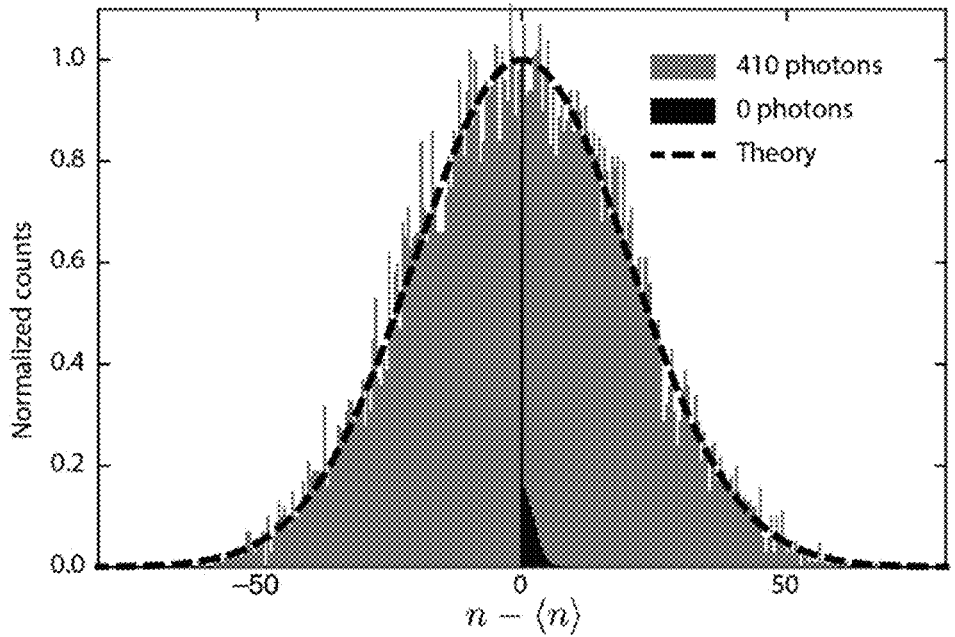

In view of the working principles of a QRNG according to the present invention mentioned above, in order to allow using these cameras to generate random numbers of quantum origin, the cameras need to be illuminated such that the mean number of absorbed photons $\bar{n}$ is sufficient to give a quantum uncertainty $\sigma_q = \sqrt{\bar{n}}$ as large as possible whilst not saturating the detectors. Therefore, in practice, the ATIK and Nokia cameras used here to demonstrate feasibility of a device for quantum random number generation according to the present invention are illuminated during a time interval T sufficient to generate $1.5 \times 10^4$ e⁻ and 410 e⁻, respectively. The specifications and operating parameters mentioned here above are summarized in Table 1. Normalized histograms of the obtained photon distributions are shown in FIGS. 5a and 5b for the ATIK 383L CCD camera and for the Nokia N9 CMOS camera, respectively.

TABLE 1

Specifications of and Operating Parameters Employed for the Two Cameras

|  | ATIK 383L | Nokia N9 |
| --- | --- | --- |
| Noise $\sigma_t$ (e⁻) | 10 | 3.3 |
| Saturation (e⁻) | $2 \times 10^4$ | 450-500 |
| Illumination (e⁻) | $1.5 \times 10^4$ | 410 |
| Quantum uncertainty $\sigma_q$ (e⁻) | 122 | 20 |
| Offset (e⁻) | 144 | −6 |
| Output bits per pixel | 16 | 10 |
| Quantum entropy per pixel | 8.9 bits | 6.4 bits |
| Quantum entropy per raw bit | 0.56 | 0.64 |

At second place, it is then possible on the basis of these facts and operating parameters to use equation (2) to calculate the amount of entropy of quantum origin per pixel, which is 8.9 bits and 6.4 bits for the ATIK 383L CCD camera and for the Nokia N9 CMOS camera, respectively. These are encoded over 16 and 10 bits, respectively, resulting in an average entropy per output bit of 0.56 for the ATIK 383L CCD camera and 0.64 for the Nokia N9 CMOS camera. These results are also figuring in Table 1. Finally, an adequate extractor 3 is applied according to equation (3) which allows to apply a mixing of the randomness of quantum origin contained in each raw bit obtained from the detector 2 into the output bits of the randomness extractor 3 forming the final digital output of the QRNG as well as to increase the entropy in the output bits of the randomness extractor 3 as compared to the one in the raw bits obtained from the detector 2. This is an important reason why it is preferable, but not necessary for realization of a QRNG according to the present invention that the inevitable technical noise $\sigma_t$ of the detector 2 is smaller, or comparable to, the quantum uncertainty $\sigma_q$. The choice of the extractor 3, in particular with respect to its dimension k, is done according to the above mentioned principles. In fact, as mentioned above, the detected photon number distribution can be described by a Poisson distribution and its minimum entropy can be approximated by equation (1). Thus, the size and the compression factor of the extractor 3 may be tuned such as to ensure that each bit of output from the extractor has an amount of quantum entropy close to 1 by determining the size and the compression factor of the randomness extractor so that the number of output bits per measurement is smaller than the minimal entropy of the detected photon number distribution. In the particular case of the matrix-multiplication extractor introduced above, this can be done using equation (4) and ensuring that the extractor's parameters l and k, for a mean entropy s per bit, are chosen such as to ensure that the probability ε that the extractor's output bit string deviates from a perfectly random one is small. In particular, equation (4) above allows to calculate that by using the camera in the Nokia cell phone and an extractor with a compression factor of 4, for example, with k=500 and l=2000, it would take ~$10^{118}$ trials to notice a deviation from a perfectly random bit string. Thus, if everybody on earth used such a device constantly at 1 Gbps, it would take ~$10^{80}$ times the age of the universe for one to notice a deviation from a perfectly random bit string.

In order to test the quality of random numbers generated in such manner, 48 frames corresponding to approximately 5 Gbits of raw random numbers generated using the above described framework were collected and processed on a computer through an extractor with a 2000 bit input vector and a 500 bit output vector, which allowed to generate 1.25 Gbits of random numbers. Although random number generators are notoriously hard to test, it is possible to check the generated bit string for specific weaknesses. A first testing step may be to individuate potential problems of the system and then test for them. In the present case, the generated random bit string was tested before extraction. At this stage, the entropy per bit is still considerably less than unity; moreover, possible errors could arise from damaged or dead pixels of the detector 2 and from correlations between pixel values due to electrical noise. In fact, besides increasing the mean entropy per bit, the randomness extractor 3 also ensures that if some pixels become damaged, covered by dust, or suffer from any other problem, an extremely good quality of the randomness is maintained. A second testing step may consist in the "die harder" randomness tests which can be applied on both the extracted bit strings, i.e., the raw random numbers produced at the output of the detector 2 and the random numbers delivered by the randomness extractor 3. This set of tests contains the NIST test, the diehard tests and some extra tests. The QRNG according to the present invention passed all these tests.

Next to the quality of the random numbers generated, other parameters of a QRNG are important, e.g., the production speed of the random numbers, as well as affordability and portability of the device. In fact, for many applications, such as the generation of cryptographic keys for conventional use or gaming, speed is not as important as the affordability and portability which are provided by this system. Nevertheless, a quantum random number generator based on an image sensor can provide very reasonable performance in terms of speed. Consumer grade devices such as the CCD and CMOS detectors used acquire data at rates between 100 Megapixels per second and 1 Gigapixel per second. After the necessary processing, each pixel will typically provide 3 random bits so that rates between 300 Mbps and 3 Gbps can be obtained. To sustain such high data rates, processing can be done either on a Field Programmable Gate Array (FPGA) or could be embedded directly on a CMOS sensor chip, including the processing step realized by the randomness extractor 3 which in that case is featured by hardware. Alternatively, implementing the randomness extractor 3 fully in the software of a consumer device is possible and can sustain random bit rates greater than 1 Mbps, largely sufficient for most consumer applications. Therefore, it is possible to realize a device for quantum random number generation according to the present invention by using technology compatible with consumer and portable electronics.

Thus, random numbers of a quantum origin can be extracted by illuminating a known image sensor and applying specific operating parameters to the photon sensor 2.2, the processing electronics, as well as the randomness extractor 3. In fact, according to the above figuring explanations with respect to a device for random number generation based on an optical process of quantum nature, a corresponding method for random number generation comprises the steps of providing a light source 1 emitting photons randomly, providing a light detector 2 adapted to absorb the randomly emitted photons and to measure the number n of photons produced by said light source 1 in a time interval T and comprising a photon sensor 2.2, an amplifier 2.3, and an analog-to-digital converter 2.4, and providing a randomness extractor 3, such as to allow detecting the number n of photons produced by said light source 1 in a time interval T and converting said number of photons into a corresponding number of electrons with the help of said photon sensor 2.2 of detector 2, converting the electron signal received from the photon sensor 2.2 into a voltage and amplifying the voltage signal V with the help of said amplifier 2.3 of detector 2, and treating the amplified signal V received from the amplifier 2.3 by encoding the amplified signal V into digital values with the help of said analog-to-digital converter 2.4 of detector 2 and sending these values to the randomness extractor 3 for further processing such as to produce quantum random numbers (QRNs) based on said number n of photons produced by the light source 1 in a time interval T.

The photon sensor 2.2 of detector 2 is illuminated by the light source 1 during a time interval T which is chosen such that the mean number of absorbed photons $\bar{n}$ is sufficient to give a quantum uncertainty $\sigma_q = \sqrt{\bar{n}}$ as large as possible whilst not saturating the photon sensor 2.2. In particular, the photon sensor 2.2 of detector 2 is illuminated by the light source 1 with a photon intensity situated within a range of intensities where the Fano factor of the photon sensor 2.2 is close to 1. It is also possible to control the mean number of absorbed photons by adjusting the exposure time of the camera, within the limit that the exposure time needs to be chosen such that the camera works in its linear regime.

Advantageously, the raw digital values $r_i$ generated at the ouput of detector 2, respectively the digital values $y_j$ at the output of the randomness extractor 3 are encoded over b bits, or are encoded on another basis than the binary system.

Finally, it is to be noted that the present invention is also related to computer program means stored in a computer readable medium adapted to implement the above described method.

In light of the above description of the device and of the corresponding method according to the present invention, its advantages are clear. Most importantly, a device for quantum random number generation according to the present invention allows generation of high quality random numbers of quantum origin since being based on a fundamentally random physical process. The random numbers may be generated at a high rate. The device can be implemented with commercially-available imaging devices such as CMOS and CCD cameras which are small and low cost. Also, it can be easily integrated on a printed circuit board. In fact, all elements such as light source, light detector, and randomness extractor, as well as other, optional components like for self-testing and further data processing such as encryption and transmission can be integrated at the system, circuit, package or dye level, which improves size, ease of use, security, reliability and energy efficiency of the whole device. Furthermore, many mobile and computing devices nowadays include an image sensor of a type adapted to be used, either by minor modification or in some cases directly, as a detector such as required in a device according to the present invention to generate quantum random numbers. Such image sensors have a low-power consumption compatible with mobile and battery powered applications. The randomness extractor can be implemented in hardware or, by software. Due to its small size, the device can be integrated with other components such as a camera, encryption, transmission, diagnostic device etc.; in particular, given that many consumer electronics articles are anyway equipped with an image sensor adapted to be used for the purposes of the present invention, the latter may advantageously be integrated with such components and corresponding software into a computer, a telephone, in particular mobile computers or telephones, tablets, network cryptographic devices, personal cryptographic devices, electronic wallets, or any other type of similar instruments. Thus, in general, the simplicity and performance of a device according to the present invention allows, in contrast to existing QRNG, to make widespread use of physical quantum random number generators, with an important impact on information security.

The invention claimed is:

1. Device for random number generation based on an optical process of quantum nature comprising:
   a light source emitting photons randomly,
   a light detector comprising a photon sensor adapted to absorb the randomly emitted photons,
   an amplifier for converting an electron signal received from the photon sensor into a voltage and amplifying the voltage signal, and
   an analog-to-digital converter (ADC) for treating the amplified signal received from the amplifier by encoding the amplified signal into digital values and sending these digital values to a randomness extractor of the device for further processing,
   wherein the randomness extractor is adapted to generate a number k of high-entropy output bits $y_j$ from a number l>k of lower-entropy raw input bits $r_i$ corresponding to said digital values received from the analog-to-digital converter (ADC),
   the photon sensor of the light detector is adapted to operate in a linear regime and acts as a photon-to-electron converter to allow the light detector to be adapted to measure a number n of photons produced by said light source in a time interval T,
   wherein the randomness extractor is further adapted to produce quantum random numbers (QRNs) based on said number n of photons produced by the light source in the time interval T.

2. The device according to claim 1, wherein the light source is selected from a group of light sources consisting of a light-emitting diode (LED), a laser diode (LD), ambient light, or any other adequate light source emitting photons randomly.

3. The device according to claim 1, wherein the photon sensor is selected from a group of photon detectors consisting of a CCD camera, a CMOS camera, in particular an image sensor with an array of pixels, or any other adequate photon detector having a sufficient single photon resolution.

4. The device according to claim 1, wherein the analog-to-digital converter has an electron-to-digital conversion factor $\zeta$ fulfilling the condition $\zeta \geq 1$.

5. The device according to claim 1, wherein the randomness extractor is implemented by software or by hardware.

6. The device according to claim 1, wherein the randomness extractor is realized by a hash function or by a vector-matrix multiplication between a vector formed by the raw bit values $r_i$ generated at the output of the light detector and a random l×k matrix M according to $$y_j = \Sigma M_{ji} r_i,$$

where the matrix M serving as the randomness extractor is a pre-generated constant having randomly-distributed matrix elements, a vector formed by the bit values y is a digital output of the randomness extractor, and i ranges from 1 to l and j ranges from 1 to k.

7. The device according to claim 1, wherein the randomness extractor is determined such as to produce digital output bit values $y_j$ of the randomness extractor having an amount of quantum entropy per output bit close to 1.

8. The device according to claim 1, wherein the light source, light detector, amplifier, and ADC are integrated at a system, circuit, package or dye level, preferably on a Field Programmable Gate Array (FPGA) or directly on a CMOS sensor chip.

9. An apparatus, in particular a computer, a telephone, a mobile computer or mobile telephone, a tablet computer, a smart phone, a network cryptographic device, a personal cryptographic device, an electronic wallet, or any other type of similar instruments, comprising the device of claim 1.

10. A method for random number generation based on an optical process of quantum nature comprising the steps of:
providing a light source emitting photons randomly,
providing a light detector comprising a photon sensor adapted to absorb the randomly emitted photons, an amplifier, and an analog-to-digital converter,
converting an electron signal received from the photon sensor into a voltage and amplifying the voltage signal using said amplifier of the light detector,
treating the amplified signal received from the amplifier by encoding the amplified signal into digital values using said analog-to-digital converter of the light detector and sending these values to a randomness extractor for further processing, and
providing a randomness extractor being adapted to generate a number k of high-entropy output bits $y_j$ from a number l>k of lower-entropy raw input bits $r_i$ corresponding to said digital values received from the analog-to-digital converter,
operating the photon sensor of the light detector in a linear regime such as to allow detecting a number n of photons produced by said light source in a time interval T and converting said number of photons into a corresponding number of electrons with the help of said photon sensor of the light detector,
producing, via the randomness extractor, quantum random numbers (QRNs) based on said number n of photons produced by the light source in a time interval T.

11. The method according to claim 10, wherein the photon sensor of the light detector is illuminated by the light source during the time interval T, wherein a mean number of absorbed photons $\bar{n}$ is sufficient to give a quantum uncertainty $\sigma_q = \sqrt{\bar{n}}$ as possible without saturating the photon sensor.

12. The method according to claim 10, wherein the photon sensor of the light detector is illuminated by the light source with a photon intensity situated within a range of intensities where the Fano factor of the photon sensor is close to 1.

13. The method according to claim 10, wherein an exposure time during which the photon sensor is illuminated by the light source is selected such that the light detector works in its linear regime.

14. The method according to claim 10, wherein the raw input bits $r_i$ generated by the analog-to-digital converter at an output of the light detector, respectively the output bits $y_j$ at the output of the randomness extractor are encoded over b bits, or are encoded on another basis than the binary system.

15. A computer program product stored in a non-transitory computer readable storage medium, the computer program product being executable by a processor to implement, in combination with the light source emitting photons randomly, a light detector comprising a photon sensor adapted to absorb the randomly emitted photons, an amplifier, an analog-to-digital converter, and a randomness extractor, the method according to claim 10.

* * * * *